US009233293B2

(12) United States Patent
Lockton

(10) Patent No.: US 9,233,293 B2
(45) Date of Patent: *Jan. 12, 2016

(54) METHOD OF AND SYSTEM FOR CONDUCTING MULTIPLE CONTESTS OF SKILL WITH A SINGLE PERFORMANCE

(71) Applicant: Winview, Inc., Menlo Park, CA (US)

(72) Inventor: David B. Lockton, Redwood City, CA (US)

(73) Assignee: WINVIEW, INC., Menlo Park, CA (US)

( * ) Notice: Subject to any disclaimer, the term of this patent is extended or adjusted under 35 U.S.C. 154(b) by 304 days.

This patent is subject to a terminal disclaimer.

(21) Appl. No.: 13/859,554

(22) Filed: Apr. 9, 2013

(65) Prior Publication Data

US 2013/0225299 A1    Aug. 29, 2013

Related U.S. Application Data

(63) Continuation of application No. 13/246,464, filed on Sep. 27, 2011, now Pat. No. 9,056,251, which is a continuation-in-part of application No. 13/215,052, filed on Aug. 22, 2011, now Pat. No. 8,622,798, which (Continued)

(51) Int. Cl.
*G06F 17/00* (2006.01)
*A63B 71/06* (2006.01)
(Continued)

(52) U.S. Cl.
CPC ............... *A63B 71/06* (2013.01); *A63F 13/12* (2013.01); *G07F 17/32* (2013.01); *G07F 17/3276* (2013.01); *G07F 17/3295* (2013.01)

(58) Field of Classification Search
USPC .............................. 463/5.9, 16, 42
See application file for complete search history.

(56) References Cited

U.S. PATENT DOCUMENTS

| 4,141,548 A | 2/1979 | Everton |
| 4,270,755 A | 6/1981 | Willhide et al. |

(Continued)

FOREIGN PATENT DOCUMENTS

| CA | 2252021 | 11/1998 |
| CA | 2252074 | 11/1998 |

(Continued)

OTHER PUBLICATIONS

"Two Way TV Patent and Filing Map" www.twowaytv.com/version4/technologies/tech_patents.asp.

(Continued)

*Primary Examiner* — Ronald Laneau
(74) *Attorney, Agent, or Firm* — Haverstock & Owens LLP

(57) ABSTRACT

A method of and system for conducting multiple competitions of skill for a single performance are described herein. User generated competition groups and system generated competition groups allow users to participate in multiple competitions at once based on answering the same questions or making the same selections related to a single event. The users are informed of each competition either via email, text message or when logging into the network via a website. The users select which competitions groups to join. After joining the desired groups, the users then make their selections related to the event which are transmitted to the network where results are tabulated and transmitted back to the users. The results are separated based on each competition group, so that users can continually know where they stand in each separate competition. With multiple competition groups, users are able to have varying success from the same performance in multiple competitions.

21 Claims, 3 Drawing Sheets

Related U.S. Application Data is a continuation of application No. 11/652,240, filed on Jan. 10, 2007, now Pat. No. 8,002,618.

(60) Provisional application No. 60/757,960, filed on Jan. 10, 2006.

(51) Int. Cl.
    *G07F 17/32* (2006.01)
    *A63F 13/30* (2014.01)

(56) References Cited

U.S. PATENT DOCUMENTS

| | | |
|---|---|---|
| 4,496,148 A | 1/1985 | Morstain et al. |
| 4,592,546 A | 6/1986 | Fascenda et al. |
| 4,816,904 A | 3/1989 | McKenna et al. |
| 5,013,038 A | 5/1991 | Luvenberg et al. |
| 5,035,422 A | 7/1991 | Berman |
| 5,073,931 A | 12/1991 | Audebert et al. |
| 5,083,271 A | 1/1992 | Thacher et al. |
| 5,083,800 A | 1/1992 | Lockton |
| 5,120,076 A | 6/1992 | Luxenberg et al. |
| 5,213,337 A | 5/1993 | Sherman |
| 5,227,874 A | 7/1993 | Von Kohorn |
| 5,263,723 A | 11/1993 | Pearson et al. |
| 5,283,734 A | 2/1994 | Von Kohorn |
| 5,343,236 A | 8/1994 | Koppe et al. |
| 5,343,239 A | 8/1994 | Lappington et al. |
| 5,462,275 A | 10/1995 | Lowe et al. |
| 5,479,492 A | 12/1995 | Hofstee et al. |
| 5,553,120 A | 9/1996 | Katz |
| 5,566,291 A | 10/1996 | Boulton et al. |
| 5,585,975 A | 12/1996 | Bliss |
| 5,586,257 A | 12/1996 | Perlman |
| 5,589,765 A | 12/1996 | Ohmart et al. |
| 5,643,088 A | 7/1997 | Vaughn et al. |
| 5,663,757 A | 9/1997 | Morales |
| 5,759,101 A | 6/1998 | Von Kohorn |
| 5,761,606 A | 6/1998 | Wolzien |
| 5,762,552 A | 6/1998 | Vuong et al. |
| 5,764,275 A | 6/1998 | Lappington et al. |
| 5,813,913 A | 9/1998 | Berner et al. |
| 5,818,438 A | 10/1998 | Howe et al. |
| 5,838,774 A | 11/1998 | Weiser, Jr. |
| 5,860,862 A | 1/1999 | Junkin |
| 5,870,683 A | 2/1999 | Wells et al. |
| 5,916,024 A | 6/1999 | Von Kohom |
| 5,970,143 A | 10/1999 | Schneier et al. |
| 5,971,854 A | 10/1999 | Pearson et al. |
| 5,987,440 A | 11/1999 | O'Neil et al. |
| 6,009,458 A | 12/1999 | Hawkins et al. |
| 6,016,337 A | 1/2000 | Pykalisto |
| 6,117,013 A | 9/2000 | Elba |
| 6,126,543 A | 10/2000 | Friedman |
| 6,174,237 B1 | 1/2001 | Stephenson |
| 6,182,084 B1 | 1/2001 | Cockrell et al. |
| 6,193,610 B1 | 2/2001 | Junkin |
| 6,222,642 B1 | 4/2001 | Farrell et al. |
| 6,233,736 B1 | 5/2001 | Wolzien |
| 6,251,017 B1 | 6/2001 | Leason et al. |
| 6,293,868 B1 | 9/2001 | Bernard |
| 6,312,336 B1 | 11/2001 | Handelman et al. |
| 6,411,969 B1 | 6/2002 | Tam |
| 6,416,414 B1 | 7/2002 | Stadelmann |
| 6,425,828 B2 | 7/2002 | Walker et al. |
| 6,434,398 B1 | 8/2002 | Inselberg |
| 6,470,180 B1 | 10/2002 | Kotzin et al. |
| 6,524,189 B1 | 2/2003 | Rautila |
| 6,527,641 B1 | 3/2003 | Sinclair et al. |
| 6,530,082 B1 | 3/2003 | Del Sesto et al. |
| 6,578,068 B1 | 6/2003 | Bowman-Amuah |
| 6,594,098 B1 | 7/2003 | Sutardja |
| 6,604,997 B2 | 8/2003 | Saidakovsky et al. |
| 6,610,953 B1 | 8/2003 | Tao et al. |
| 6,648,760 B1 | 11/2003 | Nicastro |
| 6,659,860 B1 | 12/2003 | Yamamoto et al. |
| 6,659,872 B1 | 12/2003 | Kaufman et al. |
| 6,690,661 B1 | 2/2004 | Agarwal et al. |
| 6,718,350 B1 | 4/2004 | Karbowski |
| 6,752,396 B2 | 6/2004 | Smith |
| 6,758,754 B1 | 7/2004 | Lavanchy et al. |
| 6,758,755 B2 | 7/2004 | Kelly et al. |
| 6,760,595 B2 | 7/2004 | Insellberg |
| 6,763,377 B1 | 7/2004 | Belknap et al. |
| 6,766,524 B1 | 7/2004 | Matheny et al. |
| 6,774,926 B1 | 8/2004 | Ellis et al. |
| 6,785,561 B1 | 8/2004 | Kim |
| 6,801,380 B1 | 10/2004 | Sutardja |
| 6,806,889 B1 | 10/2004 | Malaure et al. |
| 6,807,675 B1 | 10/2004 | Maillard et al. |
| 6,811,482 B2 | 11/2004 | Letovsky |
| 6,817,947 B2 | 11/2004 | Tanskanen |
| 6,824,469 B2 | 11/2004 | Allibhoy et al. |
| 6,840,861 B2 | 1/2005 | Jordan et al. |
| 6,846,239 B2 | 1/2005 | Washio |
| 6,857,122 B1 | 2/2005 | Takeda et al. |
| 6,863,610 B2 | 3/2005 | Vancraeynest |
| 6,871,226 B1 | 3/2005 | Ensley et al. |
| 6,873,610 B1 | 3/2005 | Noever |
| 6,884,172 B1 | 4/2005 | Lloyd et al. |
| 6,887,159 B2 | 5/2005 | Leen et al. |
| 6,893,347 B1 | 5/2005 | Zilliacus et al. |
| 6,942,574 B1 | 9/2005 | LeMay et al. |
| 6,960,088 B1 | 11/2005 | Long |
| 7,035,653 B2 | 4/2006 | Simon et al. |
| 7,116,310 B1 | 10/2006 | Evans et al. |
| 7,125,336 B2 | 10/2006 | Anttila et al. |
| 7,169,050 B1 | 1/2007 | Tyler |
| 7,192,352 B2 | 3/2007 | Walker et al. |
| 7,194,758 B1 | 3/2007 | Waki et al. |
| 7,240,093 B1 | 7/2007 | Danieli et al. |
| 7,244,181 B2 | 7/2007 | Wang et al. |
| 7,254,605 B1 | 8/2007 | Strum |
| 7,288,027 B2 | 10/2007 | Overton |
| 7,347,781 B2 | 3/2008 | Schultz |
| 7,351,149 B1 | 4/2008 | Simon et al. |
| 7,379,705 B1 | 5/2008 | Rados et al. |
| 7,502,610 B2 | 3/2009 | Maher |
| 7,517,282 B1 | 4/2009 | Pryor |
| 7,562,134 B1 | 7/2009 | Fingerhut et al. |
| 7,630,986 B1 | 12/2009 | Herz et al. |
| 7,753,789 B2 | 7/2010 | Walker et al. |
| 7,780,528 B2 | 8/2010 | Hirayama |
| 7,907,211 B2 | 3/2011 | Oostveen et al. |
| 7,976,389 B2 | 7/2011 | Cannon et al. |
| 8,006,314 B2 | 8/2011 | Wold |
| 8,028,315 B1 | 9/2011 | Barber |
| 8,082,150 B2 | 12/2011 | Wold |
| 8,086,445 B2 | 12/2011 | Wold et al. |
| 8,107,674 B2 | 1/2012 | Davis et al. |
| 8,109,827 B2 | 2/2012 | Cahill et al. |
| 8,176,518 B1 | 5/2012 | Junkin et al. |
| 2001/0004609 A1 | 6/2001 | Walker et al. |
| 2001/0005670 A1 | 6/2001 | Lahtinen |
| 2001/0020298 A1 | 9/2001 | Rector, Jr. et al. |
| 2001/0036272 A1 | 11/2001 | Hirayama |
| 2001/0036853 A1 | 11/2001 | Thomas |
| 2002/0010789 A1 | 1/2002 | Lord |
| 2002/0029381 A1* | 3/2002 | Inselberg ............. 725/9 |
| 2002/0042293 A1 | 4/2002 | Ubale et al. |
| 2002/0054088 A1 | 5/2002 | Tanskanen et al. |
| 2002/0055385 A1 | 5/2002 | Otsu |
| 2002/0056089 A1 | 5/2002 | Houston |
| 2002/0059623 A1 | 5/2002 | Rodriguez et al. |
| 2002/0078176 A1 | 6/2002 | Nomura et al. |
| 2002/0103696 A1 | 8/2002 | Huang et al. |
| 2002/0108125 A1 | 8/2002 | Joao |
| 2002/0108127 A1 | 8/2002 | Lew et al. |
| 2002/0115488 A1* | 8/2002 | Berry et al. ............. 463/42 |
| 2002/0124247 A1 | 9/2002 | Houghton |
| 2002/0132614 A1 | 9/2002 | Vanluijt et al. |
| 2002/0133827 A1 | 9/2002 | Newnam et al. |
| 2002/0157002 A1 | 10/2002 | Messerges et al. |
| 2002/0159576 A1 | 10/2002 | Adams |

(56) References Cited

U.S. PATENT DOCUMENTS

| | | |
|---|---|---|
| 2002/0162031 A1 | 10/2002 | Levin et al. |
| 2002/0177483 A1 | 11/2002 | Cannon |
| 2003/0013528 A1 | 1/2003 | Allibhoy et al. |
| 2003/0040363 A1 | 2/2003 | Sandberg |
| 2003/0060247 A1 | 3/2003 | Goldberg et al. |
| 2003/0069828 A1 | 4/2003 | Blazey et al. |
| 2003/0070174 A1 | 4/2003 | Solomon |
| 2003/0078924 A1 | 4/2003 | Liecchty et al. |
| 2003/0086691 A1 | 5/2003 | Yu |
| 2003/0087652 A1 | 5/2003 | Simon et al. |
| 2003/0114224 A1 | 6/2003 | Anttila et al. |
| 2003/0144017 A1 | 7/2003 | Inselberg |
| 2003/0154242 A1 | 8/2003 | Hayes et al. |
| 2003/0177167 A1 | 9/2003 | Lafage et al. |
| 2003/0177504 A1 | 9/2003 | Paulo et al. |
| 2003/0195023 A1 | 10/2003 | Di Cesare |
| 2003/0208579 A1 | 11/2003 | Brady et al. |
| 2003/0211856 A1 | 11/2003 | Zilliacus |
| 2003/0212691 A1 | 11/2003 | Kuntala et al. |
| 2003/0216185 A1 | 11/2003 | Varley |
| 2003/0216857 A1 | 11/2003 | Feldman et al. |
| 2004/0014524 A1 | 1/2004 | Pearlman |
| 2004/0022366 A1 | 2/2004 | Ferguson et al. |
| 2004/0060063 A1 | 3/2004 | Russ et al. |
| 2004/0088729 A1 | 5/2004 | Petrovic et al. |
| 2004/0093302 A1 | 5/2004 | Baker et al. |
| 2004/0117831 A1 | 6/2004 | Ellis et al. |
| 2004/0117839 A1 | 6/2004 | Watson et al. |
| 2004/0128319 A1 | 7/2004 | Davis et al. |
| 2004/0148638 A1 | 7/2004 | Weisman et al. |
| 2004/0152454 A1 | 8/2004 | Kauppinen |
| 2004/0158855 A1 | 8/2004 | Gu et al. |
| 2004/0178923 A1 | 9/2004 | Kuang |
| 2004/0198495 A1 | 10/2004 | Cisneros et al. |
| 2004/0203667 A1 | 10/2004 | Schroeder et al. |
| 2004/0203898 A1 | 10/2004 | Bodin et al. |
| 2004/0224750 A1 | 11/2004 | Al-Ziyoud |
| 2004/0242321 A1 | 12/2004 | Overton |
| 2005/0021942 A1 | 1/2005 | Diehl et al. |
| 2005/0026699 A1 | 2/2005 | Kinzer et al. |
| 2005/0043094 A1 | 2/2005 | Nguyen et al. |
| 2005/0060219 A1 | 3/2005 | Deitering et al. |
| 2005/0076371 A1 | 4/2005 | Nakamura |
| 2005/0097599 A1 | 5/2005 | Plotnick et al. |
| 2005/0101309 A1 | 5/2005 | Croome |
| 2005/0113164 A1 | 5/2005 | Buecheler et al. |
| 2005/0131984 A1 | 6/2005 | Hofmann et al. |
| 2005/0138668 A1 | 6/2005 | Gray et al. |
| 2005/0210526 A1 | 9/2005 | Levy et al. |
| 2005/0235043 A1 | 10/2005 | Teodosiu et al. |
| 2005/0255901 A1 | 11/2005 | Kreutzer |
| 2005/0266869 A1 | 12/2005 | Jung |
| 2005/0273804 A1 | 12/2005 | Preisman |
| 2005/0288101 A1 | 12/2005 | Lockton et al. |
| 2005/0288812 A1 | 12/2005 | Cheng et al. |
| 2006/0025070 A1 | 2/2006 | Kim et al. |
| 2006/0047772 A1 | 3/2006 | Crutcher |
| 2006/0059161 A1 | 3/2006 | Millett et al. |
| 2006/0063590 A1 | 3/2006 | Abassi et al. |
| 2006/0089199 A1 | 4/2006 | Jordan et al. |
| 2006/0135253 A1 | 6/2006 | George et al. |
| 2006/0148569 A1 | 7/2006 | Beck |
| 2006/0156371 A1 | 7/2006 | Maetz et al. |
| 2006/0174307 A1 | 8/2006 | Hwang et al. |
| 2006/0205483 A1 | 9/2006 | Meyer et al. |
| 2006/0248553 A1 | 11/2006 | Mikkelson et al. |
| 2006/0269120 A1 | 11/2006 | Nehmadi et al. |
| 2007/0004516 A1 | 1/2007 | Jordan et al. |
| 2007/0019826 A1 | 1/2007 | Horbach et al. |
| 2007/0037623 A1* | 2/2007 | Romik ............... 463/16 |
| 2007/0083920 A1 | 4/2007 | Mizoguchi et al. |
| 2007/0106721 A1 | 5/2007 | Schloter |
| 2007/0162328 A1 | 7/2007 | Reich |
| 2007/0174870 A1 | 7/2007 | Nagashima et al. |
| 2007/0226062 A1 | 9/2007 | Hughes et al. |
| 2007/0238525 A1 | 10/2007 | Suomela |
| 2007/0243936 A1 | 10/2007 | Binenstock et al. |
| 2007/0244570 A1 | 10/2007 | Speiser et al. |
| 2007/0244585 A1 | 10/2007 | Speiser et al. |
| 2007/0244749 A1 | 10/2007 | Speiser et al. |
| 2008/0076497 A1 | 3/2008 | Kiskis et al. |
| 2008/0169605 A1 | 7/2008 | Shuster et al. |
| 2008/0270288 A1 | 10/2008 | Butterly et al. |
| 2008/0288600 A1 | 11/2008 | Clark |
| 2009/0163271 A1 | 6/2009 | George et al. |
| 2009/0234674 A1 | 9/2009 | Wurster |
| 2010/0099421 A1 | 4/2010 | Patel et al. |
| 2010/0099471 A1 | 4/2010 | Feeney et al. |
| 2010/0137057 A1 | 6/2010 | Fleming |
| 2010/0279764 A1 | 11/2010 | Allen et al. |
| 2011/0130197 A1 | 6/2011 | Bytnar et al. |
| 2011/0227287 A1 | 9/2011 | Reabe |
| 2011/0269548 A1 | 11/2011 | Barclay et al. |
| 2012/0264496 A1 | 10/2012 | Behrman et al. |
| 2012/0282995 A1 | 11/2012 | Allen et al. |
| 2013/0005453 A1 | 1/2013 | Nguyen et al. |
| 2014/0100011 A1 | 4/2014 | Gingher |
| 2014/0128139 A1 | 5/2014 | Shuster et al. |
| 2014/0279439 A1 | 9/2014 | Brown |
| 2015/0067732 A1 | 3/2015 | Howe et al. |

FOREIGN PATENT DOCUMENTS

| | | |
|---|---|---|
| CA | 2279069 | 7/1999 |
| CA | 2287617 | 10/1999 |
| EP | 0 649 102 A3 | 6/1996 |
| GB | 2364485 | 1/2002 |
| JP | 11-46356 | 2/1999 |
| JP | 11-239183 | 8/1999 |
| JP | 2000-165840 | 6/2000 |
| JP | 2000-217094 | 8/2000 |
| JP | 2000-358255 | 12/2000 |
| JP | 2001-28743 | 1/2001 |
| JP | 2000-209563 | 7/2008 |
| NZ | 330242 | 10/1998 |
| WO | 01/65743 A1 | 9/2001 |
| WO | 02/003698 A1 | 10/2002 |
| WO | 2008027811 A2 | 3/2008 |
| WO | 2008115858 A1 | 9/2008 |

OTHER PUBLICATIONS

"Ark 4.0 Standard Edition, Technical Overview" www.twowaytv.com/version4/technologies/tech_ark_professional.asp.
"Understanding the Interactivity Between Television and Mobile Commerce", Robert Davis and David Yung, Communications of the ACM, Jul. 2005, vol. 48, No. 7, pp. 103-105.
"Re: Multicast Based Voting System" www.ripe.net/ripe/maillists/archives/mbone-eu-op/1997/msg00100html.
"IST and Sportal.com: Live on the Internet Sep. 14, 2004 by Clare Spoonheim", www.isk.co.usk/NEWS/dotcom/ist_sportal.html.
"Modelling User Behavior in Networked Games by Tristan Henderson and Saleem Bhatti", www.woodworm.cs.uml.edu/rprice/ep/henderson.
"SMS Based Voting and Survey System for Meetings", www.abbit.be/technology/SMSSURVEY.htm.
"PurpleAce Launches 3GSM Ringtone Competition", www.wirelessdevnet.com/news/2005/jan/31/news6html.
"On the Performance of Protocols for collecting Responses over a Multiple-Access Channel", Mostafa H. Ammar and George N. Rouskas, IEEE INFORCOM '91, pp. 1490-1499, vol. 3, IEEE, New York, NY.
Merriam-Webster, "Game" definition, <http://www.merriam-webster.com/dictionary/agme>p. 1.
Ducheneaut et al., "The Social Side of Gaming: A Study of Interaction Patterns in a Massively Multiplayer Online Game", Palo Alto Research Center, Nov. 2004, vol. 6, Issue 4, pp. 360-369.

* cited by examiner

METHOD OF AND SYSTEM FOR CONDUCTING MULTIPLE CONTESTS OF SKILL WITH A SINGLE PERFORMANCE

RELATED APPLICATION(S)

This Patent Application is a continuation of co-pending of U.S. patent application Ser. No. 13/246,464, filed on Sep. 27, 2011, titled "METHOD OF AND SYSTEM FOR CONDUCTING MULTIPLE CONTESTS OF SKILL WITH A SINGLE PERFORMANCE" which is a continuation-in-part of co-pending U.S. patent application Ser. No. 13/215,052, filed Aug. 22, 2011, and titled "METHOD OF AND SYSTEM FOR CONDUCTING MULTIPLE CONTESTS OF SKILL WITH A SINGLE PERFORMANCE" which is a continuation of U.S. patent application Ser. No. 11/652,240, filed on Jan. 10, 2007, now U.S. Pat. No. 8,002,618, titled "METHOD OF AND SYSTEM FOR CONDUCTING MULTIPLE CONTESTS OF SKILL WITH A SINGLE PERFORMANCE" which claims priority under 35 U.S.C. §119(e) of the co-owned U.S. Provisional Patent Application No. 60/757,960, filed Jan. 10, 2006, and entitled "METHODOLOGY FOR CONDUCTING MULTIPLE CONTESTS OF SKILL WITH A SINGLE PERFORMANCE," all of which are also hereby incorporated by reference in their entirety.

FIELD OF THE INVENTION

The present invention relates to the field of distributed gaming. More specifically, the present invention relates to the field of distributed gaming utilizing a mobile device.

BACKGROUND OF THE INVENTION

In the United States alone there are over 170 million registered cellular phones. With the expiration of the U.S. Pat. No. 4,592,546 to Fascenda and Lockton, companies are able to now use the cellular phone and other mobile communication devices utilizing a multicast network to control television viewers in games of skill based upon predicting, for example, what the quarterback may call on the next play within a football game. In addition, games of skill with a common start time can be conducted simultaneously among cellular phone owners, based on classic card, dice, trivia, and other games. In order to avoid the anti-gaming laws in the various states, the winners must be determined by the relative skill, experience and practice of the player in each discrete game.

U.S. Pat. No. 5,813,913 ('913) to Berner and Lockton provides for a central computing system which includes a means of grouping participants having similar skill levels together in simultaneous, but separate, levels of competition playing an identical game. The relative performances are communicated to only those participants competing at the same skill level. The '913 patent also provides for a wireless receiving device to permanently store the specific skill level for each participant for each type of common event such as those based on televised sports or game shows. The '913 patent provides for a telephonic link at the completion of the game to collect information and update the skill level of the participants of a particular game. When a person achieves sufficient points or meets other objective criteria to graduate into another skill level, a method is provided for accomplishing this in the central computer and then transmitting an alert to the participant notifying them of their promotion. The '913 patent describes awarding prizes and providing recognition for the members of each discreet skill level in a common game. All users, no matter what level they are on, receive the same number of questions and thus the possibility of earning the same number of points. Thus direct comparisons between users at different levels, although not encouraged are possible. Such comparisons between players of disparate skills can lead to user discouragement.

Games of skill and chance have an intrinsic excitement and entertainment value. Any game is greatly enhanced by a participant's ability to know how their performance compares in relation to other participants and/or to historical performance for the game throughout the contest. As with any game of skill, competition among friends, or with strangers of similar experience, or the ability at ones option, sometimes for an extra consideration, to compete in a separate team or individual contest, offers the opportunity of increased enjoyment and prizes.

SUMMARY OF THE INVENTION

A method of and system for conducting multiple competitions of skill for a single performance are described herein. User generated competition groups and system generated competition groups allow users to participate in multiple competitions at once based on answering the same questions or making the same selections related to a single event. The users are informed of the availability of each competition either via email, text message or when logging into the network via a website. The users select which competitions groups to join. After joining the desired groups, the users then make their selections related to the event which are transmitted to the network where results are tabulated and transmitted back to the users. The results are separated for each competition group, so that users continually know where they stand in each separate competition. With multiple competition groups, users are able to have varying success from the same performance in multiple competitions.

In one aspect, a method of participating in multiple contests of skill corresponding to an event programmed in a device. The method comprises receiving a list of competitive groups to join, selecting a plurality of competitive groups to join, participating with the plurality of competitive groups by sending selections related to the event to a server and receiving standings on a device from the server, wherein the standings are based on results from the selections. The event is selected from the group consisting of a television-based sporting event, an entertainment show, a game show, a reality show, a news show, and a commercial contained in a broadcast. The event comprises card, dice, trivia and word games played simultaneously. Receiving the standings on the device occurs during participating with the plurality of competitive groups. The standings are separated based on the plurality of competitive groups. The standings are received periodically and represent relative performance in the separate competitive groups. The competitive groups are selected from the group consisting of service provider generated competitive groups and user generated competitive groups. The service provider generated competitive groups are based on general playing characteristics. The user generated competitive groups includes contacts on a social networking site. The list of competitive groups to join is received on the device selected from the group consisting of a cellular phone, a laptop computer, a personal computer, PDA and a tablet computer. The competitive groups are maintained in a database. In some embodiments, the results are adjusted using a handicap by providing additional points to users in lower level groups. In some embodiments, the method is implemented using HTML5 or a native application.

In another aspect, a method of conducting multiple contests of skill corresponding to an event programmed in a device. The method comprises generating separate competitive groups related to the event, coupling to a network to participate in the competitive groups, informing a user which of the competitive groups are available for the user to join, joining a selected number of the competitive groups, participating with the competitive groups by sending selections related to the event to a server within the network, storing results and standings on the server, wherein the standings are based on the results and the results are based on the selections and transmitting the standings to a device. A user pays a separate consideration to play in a contest of the multiple contests of skill through a micropayments system, where a prize is supplemented or funded by an entry fee or consideration paid by all who participate in a group. The method further comprises displaying the standings on the device. The server contains an application and a database for assisting in generating the competitive group. The application includes a graphical user interface. The device contains an application for assisting in generating the competitive group. Generating competitive groups related to the event further comprises coupling to the server, selecting a type of contest and additional conditions to be included in the competitive group, adding competitors to the competitive group and selecting the event for competition by the competitive group. The type of contest is selected from the group consisting of an open contest, a head-to-head contest and a team contest. Adding competitors to the competitive group includes identifying the competitors by an identifier selected from the group consisting of a username, an email address, a cellular phone number and a personal identifier. The method further comprises sending an invitation which informs the competitors of an opportunity to be included in the competitive group. The invitation is sent by a mechanism selected from the group consisting of an email, an SMS text message and a voice message. The event is selected from the group consisting of a television-based sporting event, an entertainment show, a game show, a reality show, a news show and a commercial contained in a broadcast. The event comprises card, dice, trivia and word games played simultaneously. Transmitting the standings occurs during participating with the competitive groups. The standings are separated based on the competitive groups. The standings are received periodically and represent performance within the competitive groups. The competitive groups are selected from the group consisting of service provider generated competitive groups and user generated competitive groups. The service provider generated competitive groups are based on general playing characteristics. The user generated competitive groups include contacts on a social networking site. The device is selected from the group consisting of a cellular phone, a laptop computer, a personal computer, PDA and a tablet computer. The competitive groups are maintained in a database. The results are adjusted using a handicap by providing additional points to users in lower level groups. In some embodiments, the method is implemented using HTML5 or a native application.

In another aspect, a server device for conducting multiple contests of skill corresponding to an event comprises a storage mechanism and an application for interacting with the storage mechanism to generate and store competitive groups which are used to compete in the multiple contests of skill, the application further for receiving selections related to the event, storing results and standings based on the selections, wherein the standings are based on the results and transmitting the standings to the device. The application is further for providing an interface for generating competitive groups related to the event. The event is selected from the group consisting of a television-based sporting event, an entertainment show, a game show, a reality show, a news show and a commercial contained in a broadcast. The event comprises card, dice, trivia and word games played simultaneously. The server device communicates data for generating the competitive groups, for selecting the competitive groups to join and for submitting the selections. The standings are transmitted periodically to the device and represent performance within the competitive groups. The standings are separated based on the competitive groups. A network identifies the competitive groups a user is eligible for. The server device further comprises a database stored on the server device for managing the selections, the results, the standings and the competitive groups. The results are adjusted using a handicap by providing additional points to users in lower level groups.

In yet another aspect, a device for participating in multiple contests of skill corresponding to an event comprises a communications module for coupling to a server and an application for utilizing the communications module for coupling to a server to communicate with the server to generate competitive groups which are used to compete in the multiple contests of skill. The application utilizes the communications module for coupling to the server to send selections to and receive standings from the server. The event is selected from the group consisting of a television-based sporting event, an entertainment show, a game show, a reality show, a news show and a commercial contained in a broadcast. The event comprises card, dice, trivia and word games played simultaneously. The competitive groups comprise user generated competitive groups including contacts on a social networking site. In some embodiments, the device and the server implement HTML5.

In another aspect, a method programmed in a memory of a device comprises generating a list of competitive groups to join and presenting the list of competitive groups to join, wherein the list of competitive groups are for participating in multiple contests of skill corresponding to an event. Users are provided a currency for watching the event or participating in the multiple contests of skill. The currency is redeemable for prizes or services. Each group pools the currency received by users and the currency is distributed to a member of each group. The member is chosen at random. The member is chosen based on skill. Participants in a group of the competitive groups pool sweepstakes entries together and divide a resulting award from the sweepstakes among the participants of the group. A game of skill is synchronized with the event. The game of skill is synchronized with the event using watermarking or fingerprinting. The multiple contests of skill are generated by users using a template. Promotional awards are awarded for participating. Frequent player points are offered for participating. Users are able to invite other user to a contest of the multiple contests of skill through a social networking site. A user pays a separate consideration to play in a contest of the multiple contests of skill through a micropayments system, where a prize is supplemented or funded by an entry fee or consideration paid by all who participate in a group.

DETAILED DESCRIPTION OF THE PREFERRED EMBODIMENT

Figure 1:
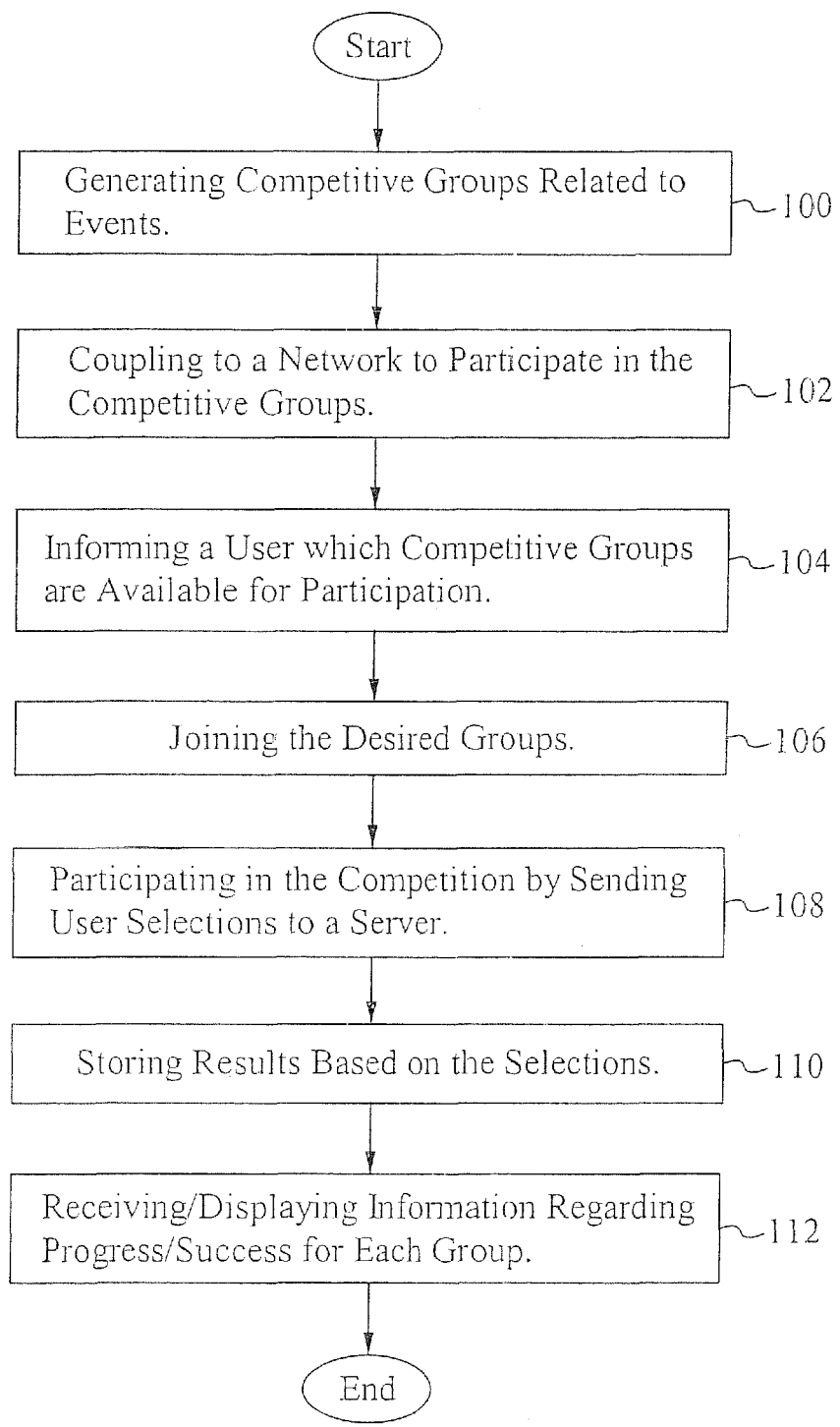
FIG. 1 illustrates a flowchart of a process of utilizing the present invention.

A method and system for conducting a variety of competitions simultaneously are described herein. The organization of competition in a game of skill has previously taken one of three basic formats:

1) Open contests: where large numbers of players enter an event, and all of the entrants are competing against each other for a single prize pool.

2) Head-to-head: where competitors are matched between a relatively small number of players identified to compete head-to-head against each other. The actual match making occurs in many forms, such as match play or elimination tournaments.

3) Team competitions: where two or more people are teamed to compete in head-to-head elimination against other similar sized teams in match play or total score competitions.

The present invention is a system and method allowing participants to simultaneously compete in multiple contests based on a single performance. For example, a user is able to participate in an open contest, compete in a team competition, and also compete against a small group of friends all utilizing a score achieved in the same event.

As a comparison, in tournaments held for bowling or golf, players are able to compete simultaneously in a gross score tournament as well as a net (handicap) tournament with the same performance. However, the contestants in the gross and net competitions are identical. The focus of the present invention is on enabling the entry of an individual in separate competitions, with separate prizes based on their single performance (score), where the pool of entrants is different for each competition.

The default mechanism for organizing a competition for this type of game in the past has been an open contest where all competitors are automatically entered in a contest against all other players. As taught in U.S. Pat. No. 5,813,913, incorporated herein by reference, the competitive field of players is also able to be divided into separate flights or groups according to skill and experience and only scores from other competitions at the same skill level are compared. Thousands of players are able to compete in a particular football game within a particular skill level.

For this example, Player A has been rated as an "intermediate" player and is competing against 10,000 other "intermediate" players in an interactive game of skill played with a live Monday Night Football broadcast. Prior to the telecast, Player A has arranged a side competition against four of his friends. Player B has organized through a match-making interface, a small competition which includes Players A, B, C, D and E. In this example, Players A and B are intermediate players, but Players C, D and E are novice players. Player B has also organized this small competition to require a $2.00 entry fee with a winner-takes-all rule. While none of the competitions require prizes or awards, they are allowable in games of skill.

When Player A logs on to a network supporting mobile games of skill, he is presented with the option of competing in the private separate contest that Player B set up. Player A agrees to compete with the $2.00 entry fee.

Separately, Player A has previously registered to participate in a sponsored season long team competition with coworkers F, G and H. The highest two scores of their four man team are totaled, and these points are added to the season's cumulative score with the highest team scores winning prizes. Thus, for a single football game, Player A is registered in: an open competition where the best competitors win prizes, a friendly competition for a prize pool of $10, and a season long team competition.

During the football game, Player A, like all of the other players, tries to get the best possible score by predicting the plays correctly before they happen. He plays in the same manner he would playing in the open contest alone, but his performance is in fact simultaneously separately scored in these completely different competitions against a different set of opponents for different rewards.

At the end of the event, Player A scored 12,565 points, in this example. That score was in the $92^{nd}$ percentile among the 10,000 intermediate players, but not high enough to win an award in that contest. That same score of 12,565 was also compared against Players B, C, D and E, and was the highest score, so Player A won the separate competition of $10. At the same time, Player A's score was the second highest among his team members in the separate team competition, and therefore was one which was totaled for the season long team competition.

It is essential to the success and enjoyment of such an invention that a potential competitor have an easy method of registering and entering these separate competitions on an ad hoc or seasonal basis. In addition, it is important to the success of such a system that all of the competitors be able to monitor periodically, not only their ongoing standings in the overall open competition at their skill level, but they will be able to periodically review all the competitions they are entered into to see the current standings.

For each of these competitions, there are two ways the group of attendees are able to be formed: A) organized by the service provider and/or a commercial sponsor or B) organized by the users themselves. Examples of service provider generated groups include those based on competitive skill level and region. For example, all intermediate players for a specific football game. An example of a user generated group is identifying five friends for a football competition. As each player enters a particular event (e.g. Monday Night Football), they are informed of the competitions they are playing in (e.g. Intermediate Global competition, the California Bay Area competition, and the personal Group competition). Each group is able to have a generic name and/or a specific name such as "personal group competition 1" or "Bob's Competition." When a player's phone or computing device establishes a connection with the network (e.g. the Airplay Network), the network identifies all of the groups that this player is able to compete in, and the server will upload this information to the phone over a cellular connection for display to the user. When a user couples to the network with a computing device other than a cellular phone, the information is available through the Internet. In some embodiments, participation in various group competitions involves additional fees. Users have the ability to choose not to compete in any or all of the groups they have been invited to.

There are two classes of Groups: System Generated Groups (e.g. Service Provider Groups) and User Generated Groups. System Generated Groups are generated by the service administrator based on database information about the user. Examples include Intermediate Skill Level and California Bay Area San Francisco 49ers Fans. User Generated Groups are defined by one or more members. A member is able to generate a group either from the services website or from a cellular phone interface. To generate a group, a member generates a name for the group or a generic name is assigned, and then the member adds other members to the group. The member is able to add other members to the group by their handle (unique identifier), email address (for new members) or by their cellular phone number. Groups are able to be assigned to a particular event. A group is able to be designated as an active group or a party. User group owners generate a party by associating the group to a particular event (e.g. December 12$^{th}$ Monday Night Football Game). In some embodiments, an email invitation or text message is sent to inform the members of the group that they have been invited to a party. In some embodiments, users are able to generate a group by joining together "friends" on social network sites such as Facebook, Twitter, Google+ or any other site. For example, a user is able to select "all Facebook contacts" to invite to join a group.

The game control server maintains a list of groups. Service Provider Groups are automatically assigned to events. User Groups are assigned to events by the group owners. In both cases, a list of active groups is known before the start of the event such as parties for a particular event. Within each of these known groups a list of all the participants is also maintained. This is able to be implemented in several ways. The most common way is via a database manager. This is able to be done through a data structure that is loaded for each event, and a database is one natural implementation to keep track of the group/participant relationships.

Throughout the game, a server manages the scores for every player. The scores are updated in a central location such as a database server, and are sorted with the members of a particular group to identify the rankings for each member in the competition.

During an event, scores and rankings are sent to members of the various groups. This is done after each scoring opportunity, or at a slower pace such as every five minutes or every five scoring opportunities. For small groups (e.g. 20 or less active participants) all of the scores and rankings are able to be sent by the server and displayed on the participant's device. For very large groups there are two approaches that can be taken: 1) Common message or 2) Individualized message. Sending a common message for large groups is much more efficient on the network, and is able to still provide a significant amount of information. The message is able to contain the top 20 names and scores as well as the score that is required to be in the top 95%, 90%, 85%, . . . 5%. When the client receives this message, it determines what percentile the user is in by extrapolating its score between the percentile scores that the user is between. In sending an individual message for a large group, the server would still send the top 20 names and scores as well as the exact percentile that this user falls in.

Each separate tournament is managed effectively. A message is sent from the game server to the individual clients associated with each group. For very large groups, this message is able to be identical for all of those that are receiving the message. Past results tracked on the cell phone and in more detail on the website will track the rankings in each of the different groups associated with an event. A selection of pre-produced audio and visual comments, for example, in the nature of taunts and cheers are able to be selected from a menu and sent to a specific individual or to all competitors in the group.

Games of skill played on the Internet or cellular phones based upon live telecast sporting events, popular game shows or commercials contained within the broadcast are expected to attract a large number of potential competitors. As in all games of skill, there will be a wide variety of experience and talent and many motivations to play. To some, the enjoyment will be competing in open competitions against skilled players to test their medal. For others, it may be just the ability to compete and possibly win against a handful of close friends who share the same passion for the underlying televised event. Others may be more team oriented and derive more enjoyment from participating as a member of the group. The method and systems described herein provide not only the ability for an individual to find a group of competitors and a contest attractive to them, but also allows them to compete in multiple contests simultaneously with the identical performance and with the same investment of time. This increases not only the sense of community, but provides greater opportunities for the satisfaction of beating friends as well as winning prizes.

FIG. 1 illustrates a flowchart of a process of utilizing the present invention. In the step 100, competitive groups are generated related to events. The competitive groups are either system generated or user generated. As described above, a system generated group is generally based on skill level, location or another generic attribute that some users qualify for, while other users do not. A user generated group is selected by a user where participants are added to the group by entering a username, email address, cellular phone number, or another distinguishing identifier. User generated groups typically include groups of friends, co-workers and other groups of people that a user wants to compete with. Any number of system groups and user groups are able to be generated. In addition to determining who is included in the competition, the events being played within the competition are selected. For example, a user is able to set up a Monday Night Football league, wherein every Monday night for the regular season of the NFL, the users within the group compete based on the Monday night game. In some embodiments, the specific games that the users compete in are selected at later dates beyond the initial generation of the group.

In the step 102, users couple to a network (e.g. a social network such as GetGlu, Miso or a network game) to participate in the generated competitions. In the step 104, the users are informed which competitions are available for participation. For example, an intermediate user couples to the network using his cellular phone and is greeted with a list of competitions available for him to join. The list includes, a free open competition for all intermediate players for a specified game, an individual group competition that his friend invited him to join also for the same specified game, a team competition that his co-workers wanted him to be a part of where it is a season long tournament which includes the same specified game and another system generated competition also for the same game that costs $10 to enter with larger prizes available than the free competition. In the step 106, each user who has coupled to the network joins the groups desired. Continuing with the example above, the user decides to join the free open competition, the friend's competition and the co-worker competition but does not join the $10 competition.

In the step 108, the users then participate in the competitions by sending user selections (e.g. predictions) to a server within the network for monitoring, analyzing and determining results based on the selections. Based on the results, standings for each competition are also determined. Using the example above again, although the user joined three different competitions related to a single game, the user competes exactly the same as if he entered in only one of the competitions, since his input is distributed for the three different competitions.

In the step 110, the results based on the users' selections are stored. The results are stored in a way such that they are easily retrieved for each competition. For example, a storing mechanism such as a database stores the results of Game X for Player A where Player A's score is 1000. In the free open competition, Player A's score was not good enough to win a prize. However, in the friendly competition, it was the highest score, and in the co-worker team competition it was a score usable by the team. Therefore, although the score was not a winning score for one competition, it was a beneficial score in the other two competitions. By competing in multiple competitions for the same game/event, a user's results/score could provide different outcomes depending on the competition. Therefore, the proper associations of each competition and the score are required.

In the step 112, each user receives the results and/or standings on his cellular phone or computer. The results and/or standings arrive at varying times depending on the setup of the system. The results and/or standings are received or at least accessible after the competition ends. If desired, the results and/or standings are also received throughout the competition such as every five minutes or after a certain number of selections are made. The standings from the results determine who wins at the end of the competition. While displayed during the game, the standings show what position the user is in. The standings are based on the results of the selections made by the users.

Figure 2:
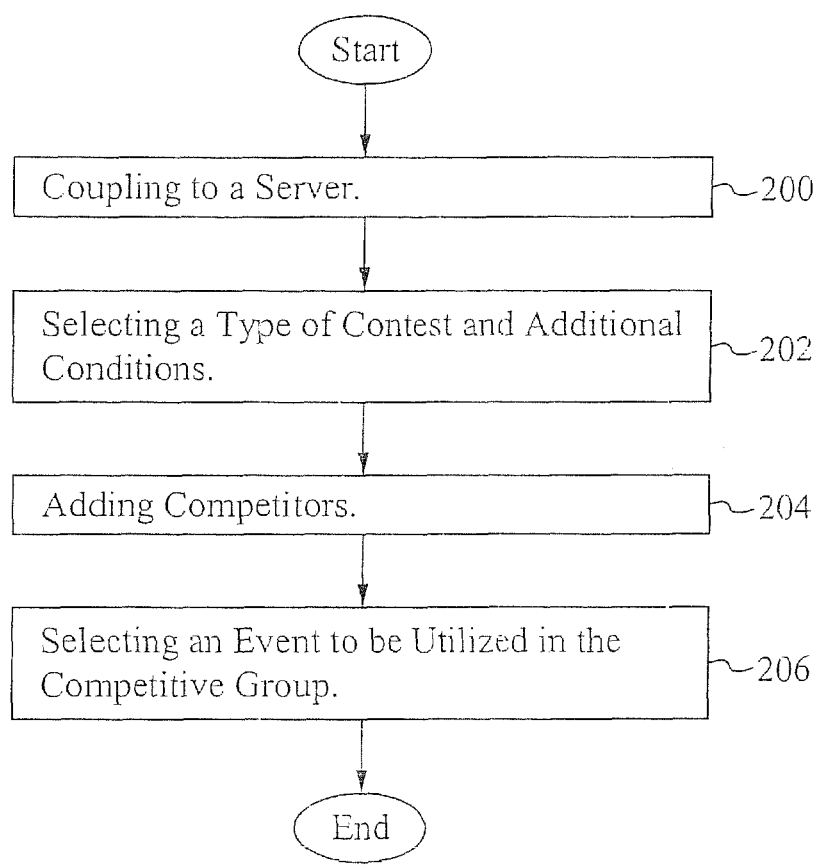
FIG. 2 illustrates a flowchart of a process of generating a user generated competition group.

FIG. 2 illustrates a flowchart of a process of generating a user generated competition group. In the step 200, a user couples to a server within a network (e.g. the Airplay Network) storing an application to generate a competition group. In some embodiments, the application is stored on the user's cellular phone instead of or in addition to on the server and is able to utilize HTML5 or use native applications on the user's cellular phone such as Java and Flash, or HTML5. Using HTML5, the processing is performed on the server, and HTML5 allows the browser on the mobile device to appear as an application even though it is a web page. Preferably, the application provides a graphical user interface such as an interactive website for easily generating the competition group. In the step 202, the user selects the type of competition, such as open, head-to-head or team, in addition to other types of competitions. The user also adds any additional requirements or conditions such as intermediate players only or $2 entry fee with the winner-take-all. Additionally, the user labels or names the competition group. In the step 204, competitors are added to the competition. The competitors are added based on a username, phone number, email address or another identification mechanism. In the step 206, either at the initial set up of the competition group or later on, one or more events are selected to be competed in. For example, if a user wants to set up a competition specifically for Super Bowl XLI, he is able to designate that immediately. Or if a user wants to start a week-long competition related to Jeopardy, he is able to do that as well. The user is also able to retain the same group and modify it to generate a second competition. For example, after the Super Bowl XLI competition ends, the user is able to generate another competition with the same group for the NCAA BCS Bowl Championship Game. Users are able to generate as basic or as complex a competition group as desired. As described above, it is able to be for a single event, a variety of events or an entire season of events. Preferably, a database is utilized to organize the competition groups for easy correlation of data.

Figure 3:
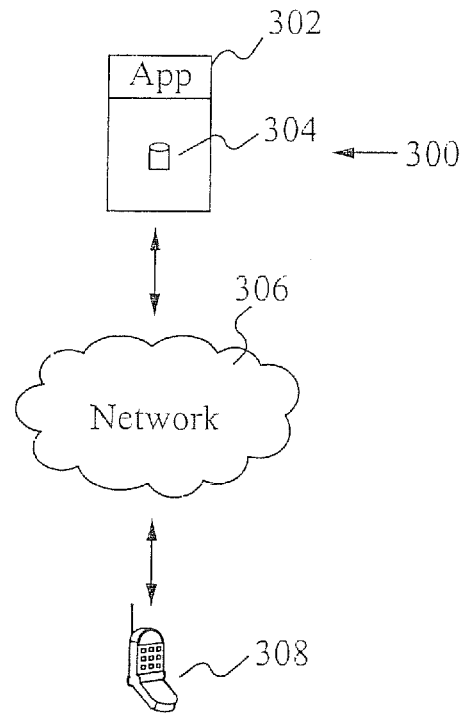
FIG. 3 illustrates a graphical representation of an embodiment of the present invention.

FIG. 3 illustrates a graphical representation of an embodiment of the present invention. A server 300 contains an application 302 and a storage mechanism 304. The application 302 is preferably a web application or at least has a web component to enable users to interact with a web graphical user interface to input data and review data. The storage mechanism 304 is utilized for storing selections and results from the selections as well as competition groups. The storage mechanism 304 preferably includes a database for organizing the data including the selections, results, standings and competition groups amongst other data needed for executing the competitions. The server 300 is part of a network 306. A device 308 couples to the server 300 through the network 306. In some embodiments the network 306 includes the Internet. In some embodiments, the network 306 includes a cellular network Also, in some embodiments, the network 306 includes both the Internet and a cellular network. The device 308 is selected from a cellular phone, a PDA, a computer, a laptop, a smart phone (e.g. an iPhone®), a tablet (e.g. an iPad®), or any other device capable of communicating with the server 300. As described above, in some embodiments, an application for allowing users to generate competition groups, input selections and communicate with the server in general is included in the device 308 instead of or in addition to the application 302 on the server 300.

Figure 4:
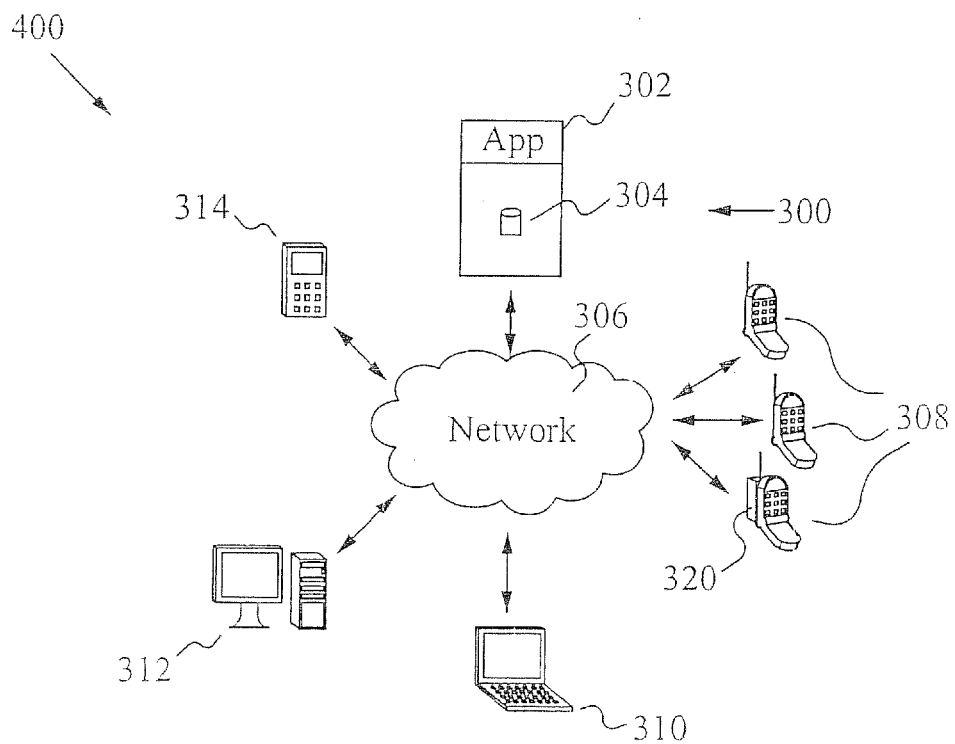
FIG. 4 illustrates a graphical representation of a network of devices.

FIG. 4 illustrates a graphical representation of a network of devices. As described above, the server 300 contains the application 302 and the storage mechanism 304 for inputting and outputting data related to the competitions. The device 308, couples to the network through a network 306. As described above, the network includes either the Internet, a cellular network or both. Although the device 308 is able to be a device other than a cellular phone as shown, other devices are also shown coupled to the network 306 therefore forming a network of devices 400. The other devices include a laptop 310, a computer 312 and a PDA 314. One of the devices 308 is shown with an application 320 for enabling the user to generate competition groups and communicate with the server 300.

In some embodiments, handicaps are implemented so that users of different levels are able to compete more fairly. Handicaps provide additional points to users at lower levels so their score is comparable to a more advanced user. The handicaps are determined based on analysis of the scoring. For example, if advanced users on average score 3000, while intermediate users on average score 2000 and beginners on average score 1000 for the same set of questions, then a fair handicap is 1000 per difference in level. Thus, when there is a friendly competition between one user who is advanced by playing every week and three beginner users who play once a month just for fun, a straight game without handicaps is not likely going to be a close competition. However, if the beginner users are given help to put them on par with the advanced user, then the outcome of the competition could result in a beginner user winning.

In some embodiments, each user competes in the same game, but slightly different sets of questions/choices are posed based on the competition level. For example, an intermediate user chooses to play in an open intermediate competition and also with a group of beginner friends. Each of the beginner users is asked to choose what type of play the following play is going to be (e.g. Run or Pass). The intermediate user is also asked to choose the following play. However, the intermediate user is also asked to choose which direction the play will go (e.g. Left or Right). Therefore, the same game is being played to some extent, but there is a slight modification, so that more advanced users have additional options. However, when scoring, the additional options apply only across the same level. Thus, the user selecting Left or Right correctly has no effect on the scoring in the beginner competition. It only affects scoring for the intermediate competition. Thus, users are able to compete at different levels for the same event.

In some embodiments, interactive advertising is used in games of chance and/or skill, sweepstakes, promotional awards, offering frequent player points. For example, a game of skill is played where the game is based on the content of an advertisement or commercial. In some embodiments, users are provided with a template and/or other facilities to generate separate games and contests within the games and promotions available to all.

In some embodiments, a contest involves a sweepstakes event, a game of skill or a promotional event available to all viewing a common event, such as a television broadcast or webcast. In some embodiments, the event is a television commercial. In some embodiments, each and every viewer receives a pre-determined amount of fungible currency such as "points." In some embodiments, the points are earned for watching and/or participating with the television commercial. In some embodiments, the points are redeemable for prizes, services or any other purpose. A user or member of the service is able to choose from an existing template of game formats, or segments of formats, and using the service's ability to couple to and communicate with their friends who are members watching or otherwise, or through social networks such as Facebook, Twitter or Google+, invite friends to participate in their separate event. In some embodiments, the event is able to require all participants in a cohort to pool all points they are to receive for watching and have all points go to that member from this cohort chosen at random utilizing software supplied by the company operating the service. The system selects and credits all of the points won to the appropriate person's account. Instead of the points being awarded by chance, the winner of the points is based on skill, for example, is able to be the person from the cohort who answers all of the questions correctly with the cumulative fastest response time (e.g. the least time elapsed between display of the question and the entry of the correct answer). In some embodiments, the points are awarded in another manner. In some cases, users form teams and challenge other competitors (e.g. friends) to form teams where total scores are used, for teams with a specific number of members, or average scores for teams with unlimited number of members.

In some embodiments, participants about to watch a television commercial in exchange for a free entry into a sweepstakes available to all viewers have the ability to invite friends to pool their sweepstakes entries so that if any of the accepting members of the group is chosen, the resulting award is divided among the group as provided by the terms of the invitation, for example, to be shared equally or to be divided equally among participants (possibly participants chosen at random). In some embodiments, the contest involves solving a puzzle or playing a word game like Scrabble®, where team contests are enabled which permit teams of friends to work collaboratively.

Users are able to leverage various groups of friends to join a closed contest, where the organizer not only provides the system and method of generating the group but also provides various templates or separate elements of games and contests allowing the organizer/inviter to click on the desired elements, designate eligible friends, and have a company generate the separate contest, administer the contest and the results and credit the winnings.

In some embodiments, payment of separate consideration such as "points" from member's credit balances or separate cash micropayments is able to be implemented. In some embodiments, a user pays a separate consideration to play in a contest of the multiple contests of skill through a micropayments system, where a prize is supplemented or funded by an entry fee or consideration paid by all who participate in a group.

In some embodiments, a game of skill is synchronized with a television broadcast. The synchronization is able to be implemented in any manner including, but not limited to, watermarking, fingerprinting and any other implementation. For example, the mobile device and/or the game of skill application determines the start (or some other point) in a broadcast, synchronizes the game with the broadcast. For example, a game that is based on commercials, is synchronized with the broadcast, so that when the commercials appear, the game begins. In some embodiments, advertisements/commercials are displayed on a user's mobile device synchronized with the content of the television. For example, if user is watching football on television, the mobile device is able to detect that and present the user a football or beer advertisement.

One methodology of synchronizing a game of skill or chance with a television broadcast requires the cooperation of an employee of the game provider based on visual observation of the telecast for that market, utilizing a personal computer and the Internet, or by utilizing their local cellular phone, all coupled to the game server.

Another methodology includes utilizing an audio or video recognition system with online access to the broadcast of the underlying television program for each separate market which provides real-time tracking of the television broadcast to the game control server, ensuring the game data file is able to be precisely synchronized to the television picture. Information is also able to be inserted in a Vertical Banking Interval (VBI) of the taped syndicated show and tracked online in real time by the game control server. For remote telecasts and online connection from a remote device, reading data embedded in the VBI via a high speed connection to the central game server is utilized. Utilizing some of the procedures outlined above, the propagation delays in the receipt of the cellular transmissions are also monitored and the game server adjusts the data files containing the "lock outs" to accommodate the systemic delay in the delivery of the game data on the cellular networks. In some embodiments, a signal based on audio recognition is sent to a server which synchronizes a preproduced file displayed on cohorts' clients.

Another methodology, with the cooperation of the producers of game shows, precise audio or video events in the telecast could either be added to the video, such as a visible count down, or existing events in the telecast identified by the producers as synchronization points which the competitors could utilize as start points for the previously downloaded data files at the press of an appropriate button on their cellular phone. This would trigger the launch of a program previously downloaded to the phone's RAM. Then, time synchronization would be launched.

One more methodology, referred to as watermarking, uses an audio signal, possibly sub-audible to humans, typically an audio artifact unique to a particular program, which is inserted into the taped audio track recognizable by the audio receiver in a cellular phone which would be utilized to start and/or continually keep the pre-produced data files resident on the cellular phone in synchronization with the telecast.

"Fingerprinting" records the soundtrack of every television programs' audio to a server. The microphone on a client is coupled to a massive audio archive on a server to identify what television program is being viewed and synchronize files on a server with the unfolding broadcast including the commercials.

In some embodiments, the game experience for users competing in games of skill or chance who experience a variety of propagation delays relating to where and how they receive a television broadcast is synchronized (e.g. using watermarking or fingerprinting).

To utilize the present invention, users select from or generate competition groups to participate in. The users select system generated competition groups which are specific to levels, geographic locations and other general categories. The users are also able to generate their own competition groups which include friends, family, co-workers or other groups of people they choose. After the competition groups are generated, users are able to join whichever group they are invited to. After joining one or more groups, the users are able to join additional groups beyond that as they are generated and become available to the user. A user is informed of the competition groups available for entering either by email, Short Message Service (SMS) text message, voice message or when the user couples to the network to view/play competitions. After joining the desired competition groups, the user participates in the competitions by answering questions or making selections based on viewing a sporting event, television show, game show, commercials contained within the broadcast or other event where skill or chance is involved in making choices. In addition, games of skill or games of chance with a common start time can be conducted simultaneously in real-time, based on classic card, dice, trivia, word and other games. The selections/answers/predictions are stored and results and/or standings are sent to the user. The results and/or standings throughout the competition show how well the user is doing compared to other competitors via standings, and when the competition is over, the results and/or standings determine who the winner is. Additionally, since multiple competitions are occurring based on a single event, the results and standings are organized so that the user is able to understand how he is doing in each event. For example, if a user is winning by a large margin in his two friendly competitions, but is slightly out of prize position in the open competition, he will not simply relax and coast to victory in his friendly competitions. He is able to realize that by performing slightly better, he still has a chance to win a prize in the open competition, while still winning easily in the friendly competitions.

In operation, the present invention allows users to set up and compete in multiple competitions for a single event. Although users are competing against typically different competitors in different competition groups, the same selections are utilized to produce scores that have specific meaning based on the competition group. As described above, a user may lose in one competition group but win in another competition group because the competitors are different. Also, the requirements of each group are different as well. For example, in team play, if the top two scores are counted and the user has one of the top two scores, then his score is important even though he lost in a different competition group. In another example, the competition group is a season long event where there is no weekly winner, but only a year-end winner. Thus, although the competitor is doing terrible one week and has no chance of winning the separate weekly competition, the user is still encouraged to do as well as possible for the year-end total. By allowing users to compete in multiple competition groups for the same event, the user interaction increases substantially. For example, instead of a user simply playing his standard weekly intermediate football competition, the user is also invited to play in his family's tournament for bragging rights, his friend's competition where the winner gets $20 and his co-worker's competition where the lowest score pays for a round of drinks the following Friday. With more chances to win, users have a much more vested interest in competing. To ensure users do not get frustrated with the scoring, the results and/or standings are displayed in a very user-friendly format so that a user knows how well he is doing in each respective competition.

In some embodiments, multiple servers are used within the network. For example, one server is dedicated for the scoring, a separate server is dedicated for the database and another server is dedicated for hosting the graphical user interface.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a device, the method comprising:
  a. receiving a list of competitive participant groups to join, wherein each competitive participant group is distinguishable based on participants in each competitive participant group;
  b. receiving user input including a group selection of a plurality of competitive participant groups to join, wherein the plurality of competitive participant groups corresponds to a same event;
  c. receiving additional user input including a single set of event selections related to the event, wherein the single set of event selections enables participating with the plurality of competitive groups by sending the single set of event selections related to the event to a server, wherein the single set of event selections is sent by a participant for the plurality of competitive participant groups; and
  d. receiving standings on a device from the server, wherein the standings are based on results from the single set of event selections.

2. The method of claim 1 wherein event comprises multiple athletic contests taking place in a single day.

3. The method of claim 1 wherein the event comprises a weekly event.

4. The method of claim 1 wherein the event comprises a week-long event.

5. The method of claim 4 wherein the week-long event comprises a competitive game show.

6. The method of claim 1 wherein the event comprises a variety of events.

7. The method of claim 1 wherein the event comprises a season of events.

8. The method of claim 1 wherein each group of the competitive participant groups vary in time duration.

9. The method of claim 8 wherein the time duration comprises weekly and year-long.

10. The method of claim 1 wherein the plurality of competitive participant groups is associated with a user-specified event.

11. The method of claim 1 wherein the event comprises events that occur on multiple days.

12. The method of claim 11 wherein the events are related events.

13. The method of claim 1 wherein the standings are separate for each of the plurality of competitive participant groups.

14. The method of claim 1 wherein a separate prize is awarded for each of the plurality of competitive participant groups.

15. A device comprising:
   a. a memory for storing an application, the application configured for
      i. displaying a list of competitive participant groups to join;
      ii. receiving user input including a group selection of a plurality of competitive participant groups to join, wherein the plurality of competitive groups corresponds to a set of events that occur on a same day;
      iii. receiving additional user input including a single set of event selections related to the event, wherein the single set of event selections enables participating with the plurality of competitive groups by sending the single set of event selections related to the set of events to a server, wherein the single set of event selections is sent by a participant for the plurality of competitive participant groups; and
      iv. receiving standings on a device from the server, wherein the standings are based on results from the single set of event selections; and
   b. a processor for processing the application.

16. The device of claim 15 wherein each competitive participant group is distinguishable based on participants in each competitive participant group.

17. The device of claim 15 wherein the set of events comprises multiple athletic contests taking place in a single day.

18. The device of claim 15 wherein the set of events are each related events.

19. The device of claim 15 wherein the standings are separate for each of the plurality of competitive participant groups.

20. The device of claim 15 wherein a separate prize is awarded for each of the plurality of competitive participant groups.

21. A method programmed in a device, the method comprising:
   a. receiving a list of competitive participant groups to join;
   b. receiving user input including a group selection of a plurality of competitive participant groups to join;
   c. receiving additional user input including a single set of event selections related to the event, wherein the single set of event selections enables participating with the plurality of competitive groups by sending the single set of event selections related to multiple athletic contests taking place in a single day to a server, wherein the single set of event selections is sent by a participant for the plurality of competitive participant groups, further wherein a separate prize is awarded for each of the plurality of competitive participant groups; and
   d. receiving standings on a device from the server, wherein the standings are based on results from the single set of event selections.

* * * * *